United States Patent [19]

Springer

[11] 4,000,376
[45] Dec. 28, 1976

[54] TELEPHONE PRIVACY DEVICE

[75] Inventor: Don C. Springer, Hudson, Wis.

[73] Assignee: Viking Electronics, Inc., Hudson, Wis.

[22] Filed: Mar. 31, 1975

[21] Appl. No.: 563,710

[52] U.S. Cl. .................. 179/17 B; 179/18 DA; 179/99; 179/39
[51] Int. Cl.² .................................. H04M 1/68
[58] Field of Search ........... 179/18 AD, 18 BC, 99, 179/30, 39, 17 B, 18 DA

[56] References Cited
UNITED STATES PATENTS

| | | | |
|---|---|---|---|
| 2,677,018 | 4/1954 | Logan | 179/17 B |
| 2,741,667 | 4/1956 | Schweider et al. | 179/39 |
| 2,873,316 | 2/1959 | Power | 179/17 B |
| 3,035,123 | 5/1962 | Nomura | 179/17 B |
| 3,155,776 | 11/1964 | Kawo et al. | 179/32 |
| 3,499,121 | 3/1970 | McIntosh et al. | 179/17 B |
| 3,530,253 | 9/1970 | Bierman | 179/17 B |
| 3,725,601 | 4/1973 | Jetzt et al. | 179/18 BC |
| 3,760,120 | 9/1973 | Moorehead | 179/19 |
| 3,860,763 | 1/1975 | Sudon et al. | 179/18 DA |
| 3,961,144 | 6/1976 | Hirate | 179/99 |

Primary Examiner—Kathleen H. Claffy
Assistant Examiner—Gerald L. Brigance
Attorney, Agent, or Firm—Frederick E. Lange

[57] ABSTRACT

A privacy device for a telephone to prevent, unless desired, another telephone from being connected to the pair of incoming lines to which the telephone is connected. The privacy device employs voltage responsive means which is effective upon the telephone being connected to the incoming lines to establish a low impedance connection to the telephone only if the voltage across the incoming lines has initially at least a predetermined value. The low impedance connection drops the voltage across the incoming lines so that other telephones with the privacy device cannot be connected thereto. Means are provided for temporarily increasing the impedance across the lines to increase the voltage so that another telephone can be connected to the line when desired. This is done in a manner not to interrupt the connection between the lines but to maintain a minimum amount of current flowing therethrough so that the central office equipment does not detect an interruption in the line.

The privacy device is also equipped with means for turning it on regardless of the voltage across the lines when it is desired to use the telephone for intercommunication purposes within an office. When the intercommunication switch is pushed, the privacy device is caused to become conductive even though the value of the voltage across the lines is below the predetermined value.

16 Claims, 7 Drawing Figures

TELEPHONE PRIVACY DEVICE

BACKGROUND OF THE INVENTION

Various arrangements have been proposed, when there are several telephones that may be connected to one line, to prevent any additional telephones other than the one in use from being connected to the same incoming line. The need for this arises in a number of different situations. In its simplest form, there may be a party line where there is a single incoming line which may be connected to any one of several telephones. A telephone normally has a "hook switch" or other main control switch which is closed when it is desired to talk. Unless some means is provided to prevent this, any other party "on the line" may listen in on the conversation by closure of the hook switch or its equivalent. Other situations that arise are those in which there are several incoming lines and a plurality of phones, any one of which may be connected to any one line. A typical case is the so-called key system. Here, where one party has answered or initiated a call and is using one of the lines, any other person may by, closing the hook switch or other main operating switch of another telephone, connect his telephone to the same line and listen to the conversation.

Various arrangements have been proposed for preventing the invasion of privacy that arises from a person picking up the receiver of another telephone and listening in on the conversation. In some cases these arrangements have involved intricate relay or switching arrangements at the key service unit in the building in which the telephones are located. It is desirable, however, to have an arrangement which may be readily applied to an existing telephone to insure its privacy. While such arrangements have been provided, they often have the weakness that it is difficult to get another party on the line if the using party desires this. In some cases, while a second party can be placed on the line, it is almost impossible to connect a third party to the line. Often, it is desirable that two or three people listen to a particular telephone conversation. Furthermore, in many cases, the presence of the privacy device makes it difficult to use the telephone as part of an intercommunication system. Obviously, the same privacy device which prevents a second party listening in on a conversation tends also to prevent someone from calling another party.

SUMMARY OF THE INVENTION

The present invention is concerned with a privacy device which is connected in series with a telephone between the telephone and the incoming lines and in series with the main control switch which is closed when it is desired to talk, this usually taking the form of a hook switch. The privacy device employs a voltage responsive means for permitting the telephone to be connected to the incoming lines only when the voltage across the incoming lines is at a predetermined value or above. When the privacy device connects the telephone to the incoming lines, the voltage drop across the incoming lines is materially reduced so that other telephones with a similar privacy device attached thereto cannot be connected to the same pair of lines. One particular feature of the present privacy device is that it is possible to temporarily increase the impedance across the incoming pair of lines to permit other telephones to be connected to the same pair of lines without interrupting the circuit between the lines and without reducing the current flow between the lines below a predetermined minimum value.

A further feature of the present invention is that the manually operated means for temporarily increasing the impedance across a pair of lines to permit other telephones to be connected thereto is in the form of a manually operable switch associated with a resistor which is either connected into the circuit in series with the main control switch to increase the impedance or is not, depending upon the position of the manually operable switch.

The system is particularly adapted for use with a key system of telephones in which there are a plurality of incoming lines, any one of which may be selectively connected to any one telephone by depressing an appropriate key button. In such case, the privacy device is connected between the key switches and the telephone so as to be effective regardless of which line is connected to the telephone by the key switch.

A further feature of the present invention is that despite the presence of the privacy device, it is possible to use the telephone for intercommunication purposes. Where the telephone is equipped with an "intercom" switch, the actuation of this switch to connect the telephone to the intercommunication lines also causes the voltage responsive means of the privacy device to become conductive regardless of the voltage across the lines. Thus, it is possible for any telephone to get on the line simply by the process of the user pressing the "intercom" button of his telephone. This operation is accomplished by applying a control voltage to an electronic element of the privacy device to cause the privacy device to become conductive regardless of the voltage across the incoming lines.

In general, I provide a voltage responsive means which comprises electronic switching elements. In one form of the invention, the switches are bi-directional electronic switches which break down and become conductive upon a predetermined voltage being applied thereto. In this form of the invention, the electronic switches have control elements and when it is desired to use the telephone for intercommunication purposes, a voltage is applied to this control element such as to cause the bi-directional switch to become conductive even though the voltage across the lines is less than that normally necessary to render the bi-directional switch conductive.

In another form of my invention employing bi-directional switches, the voltage across the line is employed to apply a signal to the control element when that voltage is above a predetermined value to cause the bi-directional switch to become conductive. The switch which is closed when it is desired to have intercommunication is also effective to apply a voltage to this control element.

In another form of my invention, a voltage divider is employed to render conductive a pair of interlocked transistors which remain conductive after the voltage drops below a value necessary to initially render them conductive.

A further feature of my invention is the provision of an auxiliary conductive path which will maintain a minimum current flowing between the two line conductors so as to give the effect at the telephone office that the telephone is in use even though the impedance has been temporarily increased in order to enable another telephone to be connected to the lines.

Various other features of the invention will be apparent from a consideration of the accompanying specification, claims and drawing.

DESCRIPTION OF THE PREFERRED EMBODIMENTS

Figures 1, 2:
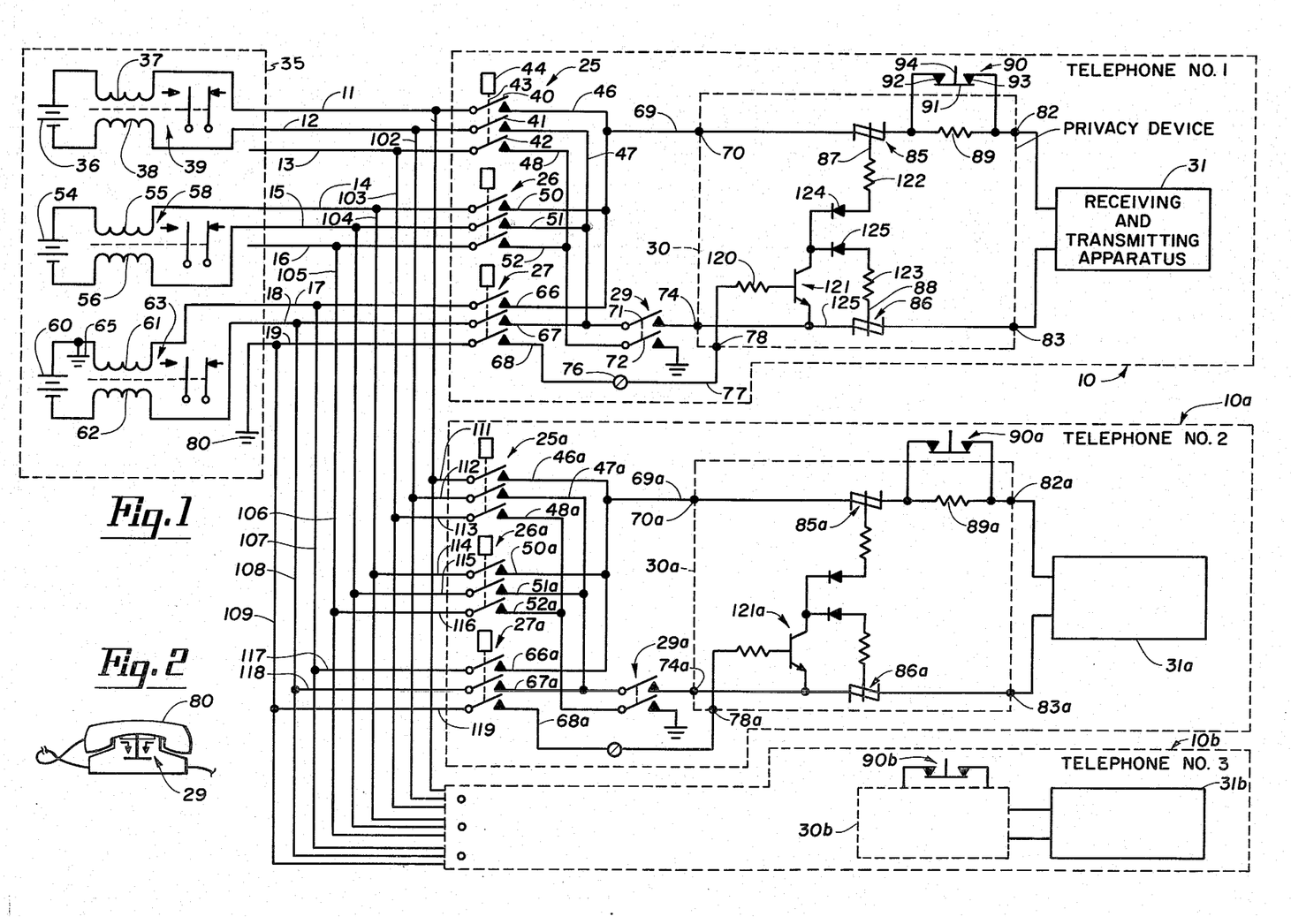
FIG. 1 is a schematic view of a portion of a telephone system employing the improved privacy device of this invention, the drawing showing two incoming telephone lines, a set of lines used for intercommunication purposes and three different telephones.
FIG. 2 is a fragmentary view of the hand set of a telephone and the hook switch associated therewith.

Referring to FIG. 1, there is shown schematically a telephone 10 which may be selectively connected to any one of three sets of lines. Lines 11, 12 and 13 constitute one set of incoming telephone lines, lines 14, 15 and 16 constitute another set of incoming telephone lines, and lines 17, 18 and 19 constitute a set of lines used for intercommunication purposes within a given office or building. Telephone 10 may be connected to any one of the three sets of lines referred to by the operation of interlocked key switches 25, 26 and 27. Such switches are in common use and are designed so that when the button of any one switch is depressed, the other switches are automatically released. These switches will be discussed in more detail. The telephone 10 is also provided with a main control switch 29 which is closed when it is desired to talk. Where the telephone employs a hand set, this switch will take the form of a hook switch which is closed when the hand set is removed from its cradle.

Secured to the telephone is a privacy device 30 in accordance with the present invention. This privacy device controls the connection of the selected incoming line to the receiving and transmitting apparatus 31 which, in the case of a telephone employing a hand set, is housed in the hand set.

Also adapted to be selectively connected to the three sets of lines 11-12-13, 14-15-16 and 17-18-19 are two other telephones 10a and 10b. It will be appreciated that there could be a number of other telephones which could be connected to these lines. For purposes of simplicity, however, only two such additional telephones have been shown. Telephone 10a, like telephone 10, is provided with a plurality of key switches 25a, 26a, and 27a which selectively serve to connect the telephone to either the lines 11-12-13, 14-15-16 or 17-18-19. These key switches are interlocked and operate in the same way as switches 25, 26 and 27. The telephone 10a has a privacy device 30a secured thereto which in turn serves to control the connection of the selected set of lines to a receiving and transmitting apparatus 31a. As with the telephone 10a, there is a main control switch 29a which in the case of a telephone with a hand set is the hook switch.

In the case of telephone 10b, the key switches and the main control switch have been omitted. It is to be understood, however, that this telephone is likewise equipped with key switches corresponding to switches 25, 26 and 27 and a main control or hook switch corresponding to switch 29.

Referring now to the lines 11-12-13, 14-15-16, and 17-18-19, these lines are shown as leading from an enclosure 35 which may be a key service unit of the type commonly employed in buildings where there are a substantial number of incoming telephone lines. The connections to the lines 11-12-13 are shown in highly schematic fashion since the exact details of the equipment connected with these lines forms no part of the present invention. As shown, a talking battery 36 is connected between lines 11 and 12 in series with relay coils 37 and 38 which are two coils of a supervisory relay 39 which, among other functions, serves to disconnect the telephone when the current through coils 37 and 38 drops below a predetermined value. Another function of this supervisory relay is to terminate the ringing when the telephone is answered. Various other functions are performed but the only function relative to the present invention is that of disconnecting the telephone when the current through the coils drops below a predetermined value. Since the operation of such supervisory relays is old, the details of the manner in which it performs its various functions are not shown.

Of the three conductors 11, 12 and 13, 11 is the conventional "tip" conductor, 12 the "ring" conductor, and 13, the so called A conductor which is used to perform various functions in the key system, which functions are not critical to the present invention.

Referring to the construction of the telephone itself, the three interlocking key switches 25, 26 and 27 are all similar in that they each have three switches which, upon actuation of a push button, are closed and which cause opening of any other switch that has been depressed. Thus, referring to switch 25, this comprises three switches 40, 41 and 42 which are normally open. The switch blades 40, 41 and 42 are positioned by an actuating mechanism 43 which is operated by a push button 44. Upon depression of push button 44, the actuating mechanism 43 causes the switches 40, 41 and 42 to to be closed and to cause either switch 26 or 27 to be opened if that switch has been closed. In other words, of the switches 25, 26 and 27, only one can be closed at the same time.

The switches 40, 41 and 42, when closed, connect the conductors 11, 12 and 13 to conductors 46, 47 and 48 within the telephone 10. The push button switches 26 and 27 will not be described since it is obvious that they likewise each contain three switches which are closed when the push buttons associated therewith are depressed. Upon closure of the switches, the switch 26, line conductors 14, 15 and 16 are connected to conductors 50, 51 and 52 in the telephone. Line conductors 14, 15 and 16 are similar to conductors 11, 12 and 13 in that they are connected to a talking battery 54 through relay coils 55 and 56 of a supervisory relay 58 corresponding in function to the supervisory relay 38 previously described. Again, conductor 14 is a tip conductor, 15 is a ring conductor and 16 is an A conductor.

While I have shown lines 11, 12 and 14, 15 going into a key service unit 35, these lines could go directly to a central office. In such case the talking batteries 36 and 54 and supervisory relays 39 and 58 would be at the central office.

Conductors 17, 18 and 19 are not connected to a central office but are used for intercommunication purposes. Conductors 17 and 18 are likewise connected to a talking battery 60 through the coils 61 and 62 of a relay 63 which performs various functions in connection with the establishment of an intercommunication talking channel. Included in such functions are turning on a light in the telephone and so forth. It will also be noted that the conductor 17 is connected to ground at 65. Thus, since conductor 17 is connected to the positive side of conductor 60, any ground connection will be positive with respect to conductor 18. It will be noted that line conductor 19 is likewise connected to ground at 80 and is hence positive with respect to conductor 18.

Referring now to the key switch 27, this likewise contains three switches and upon closure thereof the conductors, 17, 18 and 19 are connected to conductors 66, 67 and 68.

Conductors 46, 50 and 66 connected, respectively, to the tip conductors 11 and 14 of the outside lines and tip conductor 17 of the intercommunication line, are all connected together and to a common conductor 69 connected to a terminal 70 of the privacy device. Similarly, conductors 47 and 51 connected respectively to the ring conductors 12 and 15 of the outside lines and conductor 67 connected to the ring conductor of the intercommunication line are all connected together and to the switch 71 of the main control switch 29 which, in the case of a hand set, is the hook switch. Switch 71 is, in turn, connected to the input terminal 74 of the privacy device. Conductors 48 and 52 connected to the A lines 13 and 16 of the outside line are connected together and to the other switch 72 of the main control switch. This switch is in turn connected to ground so that when this main control switch or hook switch is closed, the A conductors 13 and 16 are connected to ground. Conductor 68, connected to the third conductor of the intercommunication line, is connected through the usual terminal 76 to a conductor 77 leading to a third input terminal 78 of the privacy device 30. As previously pointed out, line conductor 19, to which conductor 68 is adapted to be connected, is connected to ground at 80 so that when the conductor 68 within the telephone is connected to conductor 19, it is conducted to ground potential which, as previously explained, is substantially positive with respect to conductor 18.

The receiving and transmitting apparatus 31 is of a conventional type and not only consists of a receiver and transmitter but various auxiliary circuitry and equipment normally associated with the receiver and transmitter. I have shown, for purposes of simplicity, this as being within a box. Where the set is of the speaker type in which there is no hand piece, this will all be located within the housing of the telephone. Normally, however, there is a hand set which rests on a cradle which actuates a hook switch when the hand set is removed. Such an arrangement is shown somewhat schematically in FIG. 2 in which reference numeral 80 indicates the hand set. The hook switch 29 is shown as located beneath the hand set. It is understood that upon removal of the hand set, this hook switch 29 is closed. The receiving and transmitting apparatus 31 is connected to output terminals 82 and 83 of the privacy device 30.

Referring now to the privacy device 30, this comprises two bi-directional electronic switches 85 and 86. These are bi-lateral switches and a form which has been found desirable is that referred to as MBS 4991 marketed by Motorola Inc. Such a switch has the characteristic that when a voltage above a predetermined magnitude is applied in either direction, the switch becomes conductive; thereafter, its impedance drops markedly. The bi-directional switches employed have a combined breakdown voltage of from 12 to 18.0 volts. The switch 85 has a gate electrode 87 and the switch 86 has a gate electrode 88. When a negative voltage is applied to such a gate electrode, the bi-directional switch becomes conductive at a much lower breakdown voltage.

Connected in series with the bi-directional switch 85 is a resistor 89. This resistor is normally bypassed by a normally closed switch 90, comprising a switch blade 91 biased into engagement with two contacts 92 and 93. An actuating knob 94 is provided for moving the switch blade 91 out of engagement with contacts 92 and 93. It will be noted that contacts 92 and 93 are connected to the opposite ends of resistor 89. Hence, in the normal position of switch 90, resistor 89 is completely shorted out and plays no part in the operation of the system.

Inasmuch as the talking batteries 36 and 54 and 60 have a voltage well above the breakdown voltage of the bi-directional switches 85 and 86, for example, 20 to 50 volts, it will be apparent that when the voltage of the talking batteries is applied across the terminals 70 and 74, the bi-directional switches will break down, regardless of whether any voltage is applied to the gates 87 and 88. A circuit will thus be established from the input terminal 70 through the switch 85, the transmitting and receiving apparatus 31 and the switch 86 back to the other input terminal 74. Since input terminals 70 and 74 are connected to the tip and ring lines of a particular line when the hook swich 29 is closed and the particular key switch is closed, it will be obvious that under these conditions, the transmitting and receiving apparatus 31 is connected to the selected line and it is possible to carry on a normal telephone conversation. When this happens, the voltage drop across the incoming lines is materially reduced. Let us, for example, consider the case when lines 11 and 12 are connected to the terminals 70 and 74 by reason of the key switch 25 having been depressed and the hook switch 29 being closed. Under these conditions, there will be a circuit from the talking battery through relay coil 37, key switch 40, conductors 46 and 69, terminal 70, electronic switch 85, shunt switch 90, the receiving and transmitting apparatus 31, electronic switch 86, switch 71 of the hook switch 29, conductor 47, switch 41 of the key switch 25, ring conductor 12 and relay coil 38 back to the negative side of battery 36. The impedance of a typical receiving and transmitting apparatus is very low, for example, 180 ohms. As a result, there is a substantial current flow through the coils 37 and 38 of the supervisory relay 39. This supervisory relay is energized to perform the various functions normally performed by it. However, a substantial voltage drop occurs across these two relay coils 37 and 38 due to the relatively low impedance connection between tip and ring conductors 11 and 12. As a result, the voltage between conductors 11 and 12 will drop very materially. The result is that the voltage will be substantially less than that required to break down the bi-lateral switches 85 and 86. Since these are already conductive and tend to remain conductive once they have broken down, the circuit through receiving and transmitting apparatus 31 will not be affected. As will be presently explained, it will be impossible now for the users of telephones 10a or 10b to connect to lines 11 and 12 without the approval of the user of telephone 10.

Referring now to the connections of the lines 11, 12 and 13 to the telephones 10a and 10b, it will be noted that line conductors 11, 12 and 13 are connected through conductors 101, 102 and 103 and conductors 111, 112 and 113 to the three switches of key switch 25a. Similarly, line conductors 14, 15 and 16 are connected through conductors 104, 105 and 106 and conductors 114, 115 and 116 to the three switches of key switch 26a. Similarly, lines 17, 18 and 19 of the intercommunication set of lines are connected through conductors 107, 108 and 109 and conductors 117, 118 and 119 to the three switches of the key switch 27a. Thus, upon depression of the actuating buttons of key switch 25a, the tip and ring conductors 11 and 12 are connected to the input terminals 70a and 74a of the privacy device 30a. Were it not for the privacy device 30a, these conductors would be connected to the receiving apparatus.

Similarly, while the key switches and hook switch of telephone 10b have not been shown, it will be clear from the drawing that conductors 101 through 109 leading from conductors 11 through 19 are similarly connected to the input terminals of telephone 10b. The telephone 10b, like telephone 10a, is provided with key switches which select which line is connected to the telephone and is likewise provided with a main control switch or a hook switch which controls the connection of the telephone to the selected line. It is also to be understood that the privacy devices 30a and 30b are identical in construction to that shown in connection with privacy device 30.

It will now be readily apparent that if an attempt is made after telephone 10 has been connectd to tip and ring lines 11 and 12 for another telephone to get on the same line, the privacy device associated with that other telephone prevents this from happening. The reason for this is that, as explained above, once the bi-lateral switches 85 and 86 have broken down, the resulting current flow through the relay coils 37 and 38 and any other impedance in the line results in the voltage drop between tip and ring conductors 11 and 12 being relatively low. The result is that the voltage across the input terminals 70a and 74a of privacy device 30a, for example, is too low to break down the bi-lateral switches in that particular privacy device.

Inasmuch as the connections of telephone 10b to the various incoming lines are the same as with telephones 10 and 10a, it will be obvious that if telephone 10 is in use, telephones 10a and 10b also cannot be connected to the line except with the approval of the user of the telephone in use, as will be presently explained.

It is, of course, understood that if telephone 10a is the one which first is connected to the incoming lines, then it will be impossible for either telephones 10 or 10b to be connected. In this case, again, the voltage drop across the lines will be reduced by reason of telephone 10a being placed into use and the bi-lateral switches of that telephone being broken down to lower the impedance across the line.

So far, the discussion has been purely in connection with lines 11 and 12. It is, of course, obvious that if lines 14 and 15 are connected, for example, to telephone 10 by depression of the key switch 26 instead of key switch 25, then the operation is the same as has been described before but is applicable to lines 14 and 15. In other words, telephone 10 will be connected to the lines 14 and 15 if it is the first one which has its main operating or hook switch closed and the impedance will then fall sufficiently that the voltage across lines 14 and 15, while adequate to maintain the bi-directional switches conductive, will be inadequate to break down the bi-directional switches of other units such as the bi-directional switches 85 and 86a of privacy device 30 of telephone 10a.

It will thus be seen from the description so far that either of the lines 11-12 or 14-15 can be connected to any of the telephones 10, 10a, 10b or any other telephone adapted to be connected to these lines and that the first telephone to start talking over any of these pairs of lines will be the only one that can be connected to the lines. Thus, it is impossible for a user of another telephone to pick up the telephone and listen to a given conversation.

So far, it has been assumed that it is desired to only have one telephone connected to the incoming line. Often, however, it happens that after a person using a telephone talks a while, the user of the telephone feels that it is desirable that someone else listen in on the conversation and participate in it. In previous privacy devices, this has presented somewhat of a problem. One of the novel features of my present invention is the manner in which I make it possible to provide for a conference call. As previously explained, there is a resistor 89 in the privacy device which is normally shunted by a switch 90. This switch 90 will be referred to hereinafter as the conferencing switch. If it be assumed that the telephone 10 is the one in use and across the incoming lines of which, a relatively low impedance exists, the impedance can be increased by depressing the conference switch button 94. When this happens, the resistor 89 is connected in series with the receiving and transmitting apparatus, greatly increasing the impedance across the same. In a typical situation, this resistor 89 has a resistance of 1.5 kilohms as distinguished from the 150 to 180 ohm resistance of the receiving and transmitting apparatus. The result of placing the resistor 89 in series is that the voltage drop between incoming terminals 70 and 74 and hence between lines 11 and 12 is greatly increased to the point where the voltage drop is again greater than that necessary to break down the bi-lateral switches 85 and 86. Let us assume now, for example, that it is desired to have telephone 10a listen in on the conversation. It is now possible by signalling the user of telephone 10a and having him close the main operating switch 29a and the key switch 25a to apply the now increased voltage across lines 11 and 12 to the input terminals 70a and 74a of the privacy device 30a. Due to the fact that the voltage across these lines is now sufficiently high to break down the bi-lateral switches 85a and 86a, the receiving and transmitting apparatus 31a will now also be connected to lines 11 and 12.

One of the advantages of the conferencing switch of the present invention is that there is no time limit. If there is a delay in the answering of the phone 10a by its user, no harm is done as in certain prior systems. In certain systems, the hook switch or the main operating switch is temporarily opened. The drawback to this arrangement is that it is apt to result in the dropping of the supervisory relay 39 due to the fact that the current path through coils 37 and 38 is temporarily interrupted. In some cases, a capacitor has been employed to maintain the voltage responsive means energized in spite of the fact that the line is momentarily broken. This requires, however, that the user of the first telephone promptly recloses the line. In our privacy device, the resistor 89 is so selected that while the impedance across the input lines 11 and 12 is increased sufficiently to restore the voltage to a value sufficient to break down the bi-lateral switches, it is still sufficiently low in value that the current flowing through the receiving and transmitting apparatus and hence through the relay coils 37 and 38 will be sufficient to maintain the supervisory relay energized for as long as the conferencing switch button 94 is depressed. A further advantage of my arrangement is that the user of the first telephone can hear the user of the second telephone answer since there is no interruption of the circuit to the transmitter and receiver.

Another advantage of my conferencing switch arrangement is that it readily permits more than one other party to be connected to the line. If it is desired for a third party to be connected to the line, all that it is necessary to do is for the two parties then talking to each depress their conferencing switch button, at which time the impedance on the line will again be restored and a third party can be connected thereto. As soon as the third party is on the line, the conferencing switch buttons are released and the impedance across each of the lines is again relatively low.

So far, nothing has been said about the use of the intercommunication lines 17, 18 and 19. These lines are used when it is desired for two or three people within the building to talk with each other and go through the central telephone office. In this case, the intercom switch 27 is depressed by pressing its actuating button. This switch, like switches 25 and 26, contains three separate switches, an actuating button and an interlocking mechanism which when the button of switch 27 is depressed, causes the switches 25 and 26 to be released. When the button of intercom switch 27 is depressed, referring again to the telephone 10, the lines 17 and 18 are connected to conductors 66 and 67 as previously referred to and these conductors are in turn connected to the input terminals 70 and 74 of the privacy device as previously described. At the same time, the lowermost switch of the conferencing switch 27 serves to connect the grounded conductor 19 of the intercom lines through conductor 68, terminal 76 and conductor 77 to the incoming terminal 78, as previously described. This incoming terminal is in turn connected through a resistor 120 to the base of an NPN transistor 121, the collector of which is connected through diodes and resistors 122 and 123 to the two gates 87 and 88 of the bi-lateral switches 85 and 86. The emitter of the transistor 121 is connected to conductor 125 which is in turn connected to the input terminal 74 and through the main control switch 29 and the key switch 27 to the intercom line 18. The connection of the base of transistor 121 to the grounded line 19 results in a voltage being applied to the base of transistor 121 which is substantially positive with respect to the emitter since the emitter is connected to line 125 which in turn is connected to line 18. As previously explained, the ground connection 80 of line 19 is substantially positive with respect to line 18 due to the tip conductor 17 being connected to the positive side of the battery 60 and being grounded. The result of this is that the transistor 121 becomes conductive causing a low impedance path between the collector and emitter of transistor 121. As previously explained, the collector is connected to the gates 87 and 88 of the switches 85 and 86. The result is that these gates become connected through the resistors 122 and 123 and through diodes 124 and 125 and the collector emitter path of transistor 121 to conductor 125. This connection is such that the voltage on the gate electrodes 87 and 88 is changed in a manner to render both of the bi-lateral switches 85 and 86 conductive even though the voltage across input terminals 70 and 74 is much lower than that required to break down the bi-lateral switches 85 and 86. The result then of operating the key switch 27 is to cause the bi-lateral switches 85 and 86 to become conductive regardless of the voltage across the lines 17 and 18. Any number of other people may connect to the same lines by pressing their intercommunication key switches. In each case, the bi-lateral switches of the privacy unit are made conductive by reason of a voltage applied to the gate electrodes through the action of the transistor 121 or its equivalent in the various privacy devices.

It will be noted from the above that the circuits from transistor 121 to gate electodes 87 and 88 were traced through two diodes 124 and 125. The purpose of these diodes is to prevent current flowing from the upper conductor 169 through the switch 85, gate 87, resistors 122 and 123, gate 88 and switch 86 back to the lower line 125. If this circuit were possible, it would be possible to turn on the switches 85 and 86 at a much lower voltage than desired. By placing the two diodes 124 and 125 so that they are back to back in such a circuit, any current flow through this circuit is prevented. At the same time, the diodes have little effect upon the current flow from the two gates through the transistor 121.

It will be noted that the privacy device 30 contains a switch in each of the two lines leading to and from the receiving and transmitting apparatus. In this way, both sides of the circuit are broken to an excluded telephone. This has the advantage of further insuring against sound from an excluded line being transmitted to the connected telephone set. In some privacy devices, only one side of the line is connected.

It will further be noted that the privacy device of the present invention is adapted to be connected between the key switches and the receiving and transmitting apparatus rather then between the telephone lines and the key switches. In this way, it is possible to use only one privacy device per telephone rather than one privacy device for each set of incoming lines and for each telephone.

It will be noted in the above description that the conferencing switch 90 is shown as located outside of the dotted lines designating the privacy device 30. Furthermore, the privacy device 30 is shown as located within the block designating the telephone 10. While my invention is not limited to any particular configuration of the equipment, I have found it desirable in some cases to enclose all of the equipment shown in the dotted lines 30 in a case which is attached to the telephone and connected thereto by connections to the normal terminals within the telephone. The switch 90 may be located outside of this case and secured to the telephone at any convenient point.

Figure 3:
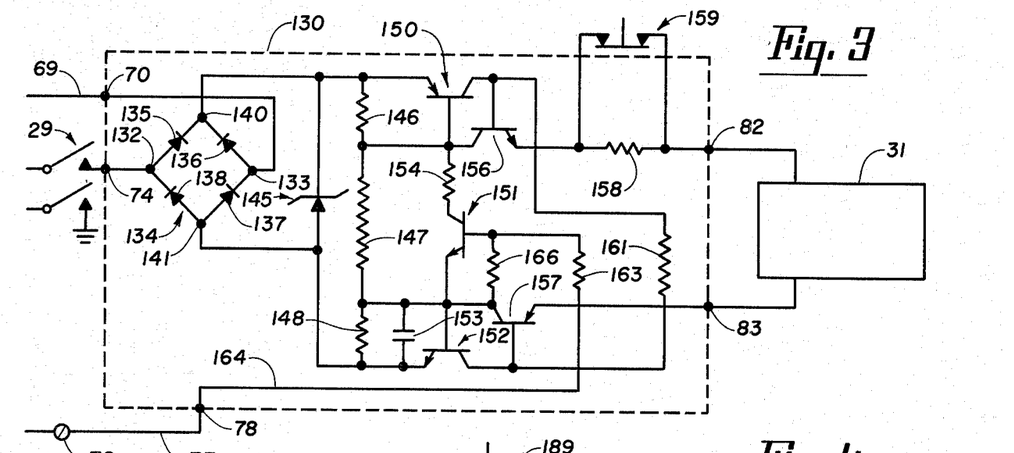
FIG. 3 is a schematic view of a modified form of privacy device.

MODIFICATION OF FIG. 3

In FIG. 3, there is shown a privacy device 130 which is a modiciation of the privacy devices 30, 30a and 30b of FIG. 1. The input terminals and output terminals of the privacy device of FIG. 3 have the same numerals applied thereto as in FIG. 1 in order to enable a ready comparison of the device of FIG. 3 with that of FIG. 1. The inputs to the privacy device of FIG. 3 and the manner in which output terminals 82 and 83 are connected to the receiving and transmitting apparatus is exactly the same as in FIG. 1 and hence has not again been shown.

Referring now to the specific arrangement of FIG. 3, the input terminals 70 and 74 leading from the tip and ring conductors through the key switch and the main control switch 29 are connected to input terminals 133 and 132, respectively, of a full wave rectifier bridge 134 having diodes 135, 136, 137, and 138, each connected to one leg of the bridge. The output terminals are designated by the numerals 140 and 141. Such full wave rectifier bridges are well known and need not be described. It will be obvious that output terminal 140 is the positive terminal and output terminal 141 is the negative terminal.

Connected across the output terminals 140 and 141 is a Zener diode 145. This Zener diode preferably has a breakdown voltage somewhat lower than the battery voltage existing across the input terminals 70 and 74 before the privacy device connects the receiver and transmitter apparatus 31 to the input lines but higher than the talking voltage which exists after the privacy device becomes conductive. For example, in a typical case, this Zener diode may have a breakdown voltage of 20 to 27 volts. The function of the Zener diode is twofold. In the first place, it guards against any voltage surges by providing a shunt across the voltage responsive mechanism to be described. Furthermore, since it has a breakdown voltage lower than the normal voltage across the batteries, it tends to provide a continuous current flow between the tip and ring conductors when the voltage is increased for conferencing purposes, thus maintaining the supervisory relay energized in spite of the increase in impedance in the circuit during the conferencing switching.

Also connected across the output terminals 140 and 141 of the rectifier bridge 134 in parallel with the Zener diode are three resistors 146, 147 and 148 forming a voltage divider. The upper resistor 146 is connected between the emitter and base of a PNP transistor 150 connected in series between the output terminal 140 of the rectifier bridge and the receiving and transmitting apparatus 31 of the telephone. Similarly, the lower resistor 148 of the voltage divider is connected between the emitter and base of an NPN transistor 152. Connected in parallel with resistor 148 and the emitter and base of transistor 152 is a capacitor 153, the function of which will presently be described. Connected between the bases of transistors 150 and 152 in series with a resistor 154 is the emitter-collector path of an NPN transistor 151. The emitter-collector path of this transistor is also connected in parallel with resistor 147 of the voltage divider so that when transistor 151 is conductive, the impedance across the terminals of resistor 147 is materially reduced. In a typical case, resistors 146 and 148 have resistance values of only 2 kilohms, whereas resistor 17 has a resistance value of 45 kilohms. The resistor 154 in series with the emitter-collector path of transistor 151 has a resistance of only 4.7 kilohms. It is thus fairly obvious that if the transistor 151 is made conductive, the effective impedance between the opposite terminals of resistor 147 is reduced materially.

Transistor 150 is coupled to and controls the conductivity of an NPN transistor 156. Similarly, the transistor 152 is connected to and controls the conductivity of a PNP transistor 157. The transistor 156 is in series with the output terminal 92 whereas the transistor 157 is in series with the output terminal 83. Thus, both transistors 156 and 157 must be conductive in order for current to flow through the transmitterreceiver 31. Connected between the emitter of transistor 156 and the output terminal 82 of the privacy device 130 is a resistor 158 which is normally bypassed by a normally closed manually operated switch 159. It will be obvious that if this switch 159 is opened, the resistor 158 is introduced in series with the receiving and transmitting apparatus, thus increasing the voltage drop between the input terminals 70 and 74. The switch 159 thus functions as a conferencing switch in the same manner as switch 90 of FIG. 1.

A relatively high value resistor 161, for example, 20 kilohms, is connected between the collectors of transistors 150 and 152. This serves to provide a path for current flow through transistors 150 and 152 before transistors 156 and 157 are turned on. Furthermore, if the operation of these transistors 146 and 157 is interrupted during the conferencing operation, the transistors 150 and 152 can remain conductive as will be described.

The function of transistor 151 in reducing the effective impedance across resistor 147 has been described. This transistor is rendered conductive when it is desired to connect different telephones together for intercommunication purposes. The base of transistor 151 is connected to the intercom terminal 78 through a resistor 163 and a conductor 164. The base of transistor 151 is connected to the emitter of that transistor through a resistor 166 and hence is normally at the same potential. When, however, the key switch for intercommunication, namely switch 27, is closed, a positive potential is applied to the base 151 through conductor 164 and resistor 163 to cause the transistor 151 to become conductive.

Referring now generally to the operation of FIG. 3, the voltage across the tip and ring conductors of the selected set of incoming lines is applied to terminals 70 and 74 when the main control switch 29 is closed. This voltage is applied through the rectifier bridge 134 to produce a positive voltage at output terminal 140 of the rectifier bridge and a negative voltage at terminal 141. The output voltage of the bridge is in turn applied across Zener diode 145 and the voltage divider comprising resistors 146, 147 and 148. When the voltage across the tip and ring conductors is at its normal value, the voltage applied across the voltage divider consisting of resistors 146, 147 and 148 is sufficiently great to cause a voltage drop across resistors 146 and 148 sufficient to turn on transistors 150 and 152. The turning on the transisters 152 is delayed for a short period of time because of the capacitor 153 previously referred to. This is a 0.1 microfarad condenser and has just sufficient capacitance to delay the buildup of the voltage across resistor 148 for a slight period of time. The reason for this is to guard against any momentary surges of voltage which would falsely turn on transistors 150 and 152 even though the normal voltage across terminals 70 and 74 was not sufficiently high to warrant connection of the receiving and transmitting apparatus 31 to the selected pair of incoming lines. This condition could arise when the privacy device 130 was connected to a telephone other than that selected and due to switching action in a telephone circuit, there would be a momentary surge in voltage applied to terminals 70 and 74.

The turning on of transistor 150 turns on transistor 156. Similarly, the turning on of transister 152 turns on transister 157. This is true because the base of transistor 156 is connected to the collector of transistor 150. Thus as soon as transistor 150 becomes conductive, current flow through the emitter-collector circuit of transistor 150 takes place through the base-emitter circuit of transistor 156, thereby turning on that transistor. The same action takes place in connection with transistor 157 when transistor 152 is turned on. A talking circuit is now established from the input terminal 70 through the rectifier bridge, the emitter-base circuit of transistor 150, the emitter-collector circuit of transistor 156, bypass switch 159, terminal 82, receiving and transmitting apparatus 31, terminal 83, transistors 157 and 152, back through the rectifier bridge through the other input terminals 74. The circuit just traced is true regardless of whether the terminal 74 or terminal 70 is positive at the moment. Under these conditions, it is now possible to carry on a conversation over the tip and ring lines connected to terminals 70 and 74. At the same time, due to the fact that the transistors 150, 156, 152 and 157 have a relatively low impedance when conductive and the same is true of the receiving and transmitting apparatus 31, the voltage drop across terminals 70 and 74 drops very abruptly as was the case with the embodiment of FIG. 1. Thus, any other telephone sets to which such a privacy device is connected will not be able to be connected to the same pair of incoming lines upon closure of the hook switch of such other receiver. The voltage cross such lines will simply not be large enough, when applied to the voltage divider of that privacy device, to cause the transistors 150 and 152 to become conductive.

If the user of the telephone to which privacy device 130 is attached desires to have another person on the line, all that it is necessary for him to do is to open the conferencing switch 159 thus removing the shunt around resistor 158. Since the resistor 158 has a relatively high resistance value such as 2 kilohms, as compared with that of the transmitter and receiver apparatus, it will be apparent that the impedance of the circuit traced between conductors 70 and 74 is suddenly greatly increased. The voltage across terminals 70 and 74 will thus be increased sufficiently that the voltage across the tip and ring conductors to which these terminals are connected will now be sufficiently high to enable a corresponding privacy device 130 connected to another telephone to become conductive and connect the receiving and transmitting apparatus of that telephone to the same pair of line wires. At the same time, due to the presence of the Zener diode 145, the current flowing through resistor 161 and the current flowing through resistor 158 and the receiving and transmitting apparatus will be collectively sufficiently great that the current flowing through the tip and ring conductors will be sufficient to keep the supervisory relay of that particular set of incoming lines energized. As soon as the other party has come on the line, the conferencing switch 159 is released and the impedance again is reduced to a value sufficiently low that other privacy devices on other telephones will not become conductive. Thus, the conferencing arrangement of the species of FIG. 3 is basically the same in operation as that described in connection with FIG. 1. There is nothing critical with regard to the time the conferencing switch 159 is held down since no capacitor is involved and the current flow through the tip and ring conductors is adequate to maintain the supervisory relay energized even though the button is held down for a substantial period of time.

As with the species of FIG. 1, provision is also made for causing the privacy device to become conductive when an intercommunication call is desired, even though the voltage across the terminals 70 and 74 may not be sufficiently high to cause the privacy device to become conductive in the manner above described. As has been described, the transistor 151 is made conductive whenever a positive voltage is applied to the intercom terminal 78 by reason of the closing of the intercom key switch 27. When transistor 151 becomes conductive the voltage drop across resistors 146 and 148 is greatly increased since the relatively high resistor 147 is effectively bypassed. The result of this is that a very substantial voltage drop will appear across both resistors 146 and 148 causing transistors 150 and 152 to become conductive. This in turn will cause transistors 156 and 157 to become conductive in the manner above described. Thus, regardless of whether the voltage across the input terminals 70 and 74 of the privacy device is above the normal value or not, the privacy device will be made conductive upon closure of the intercom key switch. This enables the user of the telephone to connect with one or more telephones through the intercom lines 17 and 18.

It will be seen that FIG. 3 functions basically the same as FIG. 1, the primary exception being that instead of using bi-directional switches, a diode bridge is employed along with a voltage divider which senses the existence of the proper voltage and causes the transistors of a self-locking transistor circuit to become conductive.

Figure 4:
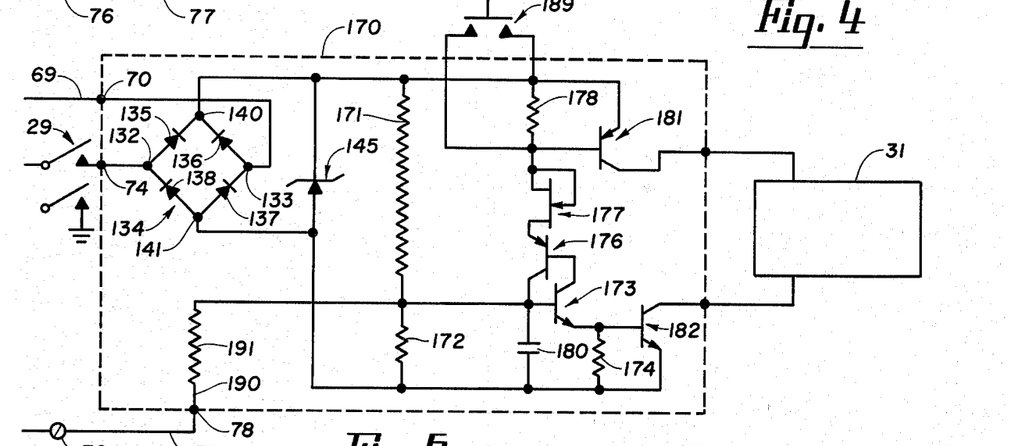
FIG. 4 is a schematic view of a further modification of my privacy device.

SPECIES OF FIG. 4

The specied of FIG. 4 is similar to that of FIG. 3 in that it employs a rectifier bridge which, because it is basically the same as the rectifier bridge 134 of the species of FIG. 3, is given the same reference characters. In general, similar reference characters are used throughout FIG. 4 where the elements are the same as in FIG. 3. In FIG. 4, the privacy device has been designated by the reference numeral 170. It is, of course, understood that there will be a similar privacy device connected with each of the other telephones as was the case with FIG. 1. Furthermore, it will be understood that the privacy device 170 can by appropriate operation of the key switches 25, 26 and 27 be connected to any of several incoming lines or to an intercommunication line.

Referring now specifically to the circuit of the privacy device 170, the voltage across the output terminals 140 and 141 of the rectifier bridge 134 is applied across the Zener diode 145 just as in FIG. 4. It is also applied across a voltage divider bridge which in this case consists of a relatively large resistor 171 and a relatively small resistor 172. In a typical case the resistor 171 had a resistance of 120 kilohms whereas the resistor 172 had a resistance of 3.6 kilohms. Thus, a substantial portion of the voltage drop between terminals 70 and 74 occurs across resistor 171. The upper terminal of resistor 172 is connected to the base of an NPN transistor 173, the emitter of which is connected through a resistor 174 to the lower terminal of resistor 172 and to the conductor leading through the rectifier bridge to the output terminal 141. Thus, the voltage across resistor 172 is effectively applied between the base and emitter of transistor 173.

The transistor 173 is connected in series with the emitter-base circuit of a PNP transistor 176 which is in turn connected in series with the drain and source electrodes of a field effect transistor 177. A resistor 178 is connected in series with the transistors 173, 176 and 177 between the conductors leading to the two output terminals of rectifier bridge 134. Whenever the voltage across terminals 70 ad 74 is sufficiently high, the voltage drop across resistor 172 will be adequate to turn on transistor 173 which in turn will turn on transistor 176 causing a current flow to flow between terminal 70 through the rectifier bridge, resistor 178, field effect transistor 177, the emitter-collector circuit of transistor 176, and resistor 172, back to terminal 74.

As with the circuit FIG. 3, a capacitor 180 is connected across the resistor 172 to delay slightly the triggering of the transistor 173. This is to prevent a situation in which, because of other telephones in use, the voltage is not normally adequate enough to render the privacy device conductive but due to some momentary surge condition, there is a temporary increase in the voltage to a value adequate to cause the privacy device to become conductive. By interposing the delay due to capacitor 180, this triggering of the privacy device from such a transient voltage is prevented.

The effect of the establishment of the circuit just discussed is to cause a current flow to take place through resistor 178 thereby establishing a voltage drop across resistor 78 and causing a current flow between the emitter and base of a further PNP transistor 181, the emitter-collector circuit of which is connected in series with the receiving and transmitting apparatus 31. At the same time, the portion of the current flowing through the circuit traced will also flow through from the emitter base circuit of transistor 176, the collector-emitter circuit of transistor 173 and the resistor 174 thereby increasing the voltage drop across resistor 174 to turn on a further NPN transistor 182, the base and emitter of which are connected acoss resistor 174.

A circuit is now established to the receiving end transmitting device from terminal 140 of the rectifier bridge through the transistor 181, the receiving and transmitting apparatus 31 and transistor 182 back to the other terminal 141 of the rectifier bridge. As a result of the establishment of this circuit, a relatively low impedance circuit is established between terminals 70 and 74. The resulting drop in voltage between terminals 70 and 74 operates, as with the other species, to prevent other telephones to which such a privacy device is connected from being connected to the same pair of incoming line conductors.

As with the other forms, provision is made for enabling other parties to be connected to the line where the person first using the telephone desires this to be the case. In the present case, this is accomplished by a conferencing switch 189 which is normally open. This conferencing switch is connected across the resistor 178 which, as previously pointed out, is connected between the emitter and base of transistor 181. When it is desired to connect another party to the line, normally open switch 189 is closed, thus creating a short circuit condition around resistor 178 and eliminating the voltage drop across that resistor. This in turn results in the transistor 181 becoming nonconductive to interrupt the circuit through receiving and transmitting apparatus 31. When this happens, the low voltage circuit through the transmitterreceiving apparatus is interrupted so that the impedance is now determined by the impedance of the voltage divider circuit including resistors 171 and 172, the impedance across the Zener diode 145, and the impedance across the circuit including the field effect transistor 177 and transistors 176 and 173. The effective impedance of these circuits is much higher than that through the receiving and transmitting apparatus, which as pointed out previously, has a very low impedance. The result again is that the voltage drop between terminals 70 and 74 rises abruptly, making it possible for a privacy device corresponding to privacy device 170 and which is attached to another telephone to become conductive. At the same time, adequate current flows through the tip and ring conductors due to the circuit through the Zener diode 145, the circuit through the voltage divider 171 and 172, and the circuit through the transistors 177, 176 and 173 to insure that the supervisory relay remains energized. As soon as the other party comes on the line, the conferencing switch 189 is released, restoring the circuit to the receiving and transmitting apparatus 31.

Again as with FIG. 3, it is possible to render the privacy device conductive regardless of the voltage across conductors 70 and 71 whenever the intercom key switch is depressed. When this happens, a positive voltage is applied through conductor 77, terminal 78, conductor 190, and resistor 191 to the upper end of transistor 172 and hence to the base of transistor 173. When this happens, transistor 173 becomes conductive regardless of the voltage which otherwise would exist across resistor 172. Looking at it another way, when the positive voltage is applied as the result of the closing of the intercom key switch, the potential at the upper end of resistor 172 is increased beyond the value which it would normally assume by reason of its position in the voltage divider. The conductivity of transistor 173 turns on transistor 176 and causes current flow through field effect transistor 177 and resistor 178. As a result, transistors 181 and 182 will be turned on in the manner previously described to connect the receiving and transmitting apparatus 31 to the terminals 70 and 74. Thus, as with the previous modifications, when the intercom key switch is closed, the privacy device is automatically turned on even though the voltage across the lines of the intercom circuit is not sufficiently high to break down the privacy device in the normal manner.

Reference has been made to the field effect transistor 177. It will be noted that the gate of this transistor is so connected that the field effect transistor acts purely as a means for maintaining a constant current flow therethrough, thereby maintaining a relatively high impedance thereacross. The result of this is that the modulation of the current flowing through lines to which the transmitter and receiver are connected is not disturbed by changes in the voltage drop across the branch of the circuit including transistors 173 and 176, which would otherwise tend to occur.

It will be seen that the arrangement of FIG. 4 is similar to FIG. 3 in that it employs a diode bridge to rectify the voltage applied to the voltage sensitive apparatus of the privacy device. Furthermore, it relies upon the voltage across a voltage divider to control the conductivity of a transistor network. As with FIG. 3, means are provided for connecting other parties to the line when desired or for using the telephone for intercommunication purposes. The species of FIG. 4 does differ from that of FIG. 3, however, in that a field effect transistor is used to avoid disturbing the effect of the current variations in the receiving and transmitting apparatus necessary for proper conversation.

Figures 5, 6, 7:
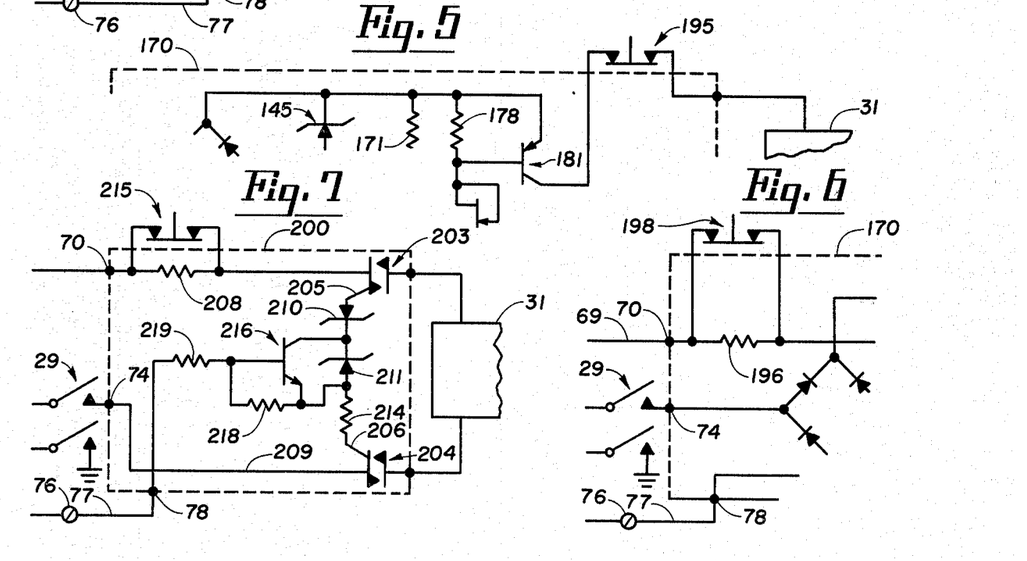
FIG. 5 shows the modified portion of a modification of FIG. 4, showing a different manner of temporarily increasing the impedance between the incoming lines to enable other telephones to be connected thereto.
FIG. 6 shows the modified portion of a still further modification of the arrangement of FIG. 4 showing a different manner in which the impedance between the lines can be temporarily increased for conferencing purposes.
FIG. 7 is a schematic view of another type of privacy device in accordance with my invention.

In FIGS. 5 and 6, I have shown modifications of FIG. 4 in which different means for obtaining conferencing are obtained. Referring to FIG. 5, which shows only a portion of the circuitry of FIG. 4 except for the modified portion, all of the elements are the same except for the fact that the conferencing switch 195 is a normally closed switch connected in series with the collector of transistor 181 between the collector and the receiving and transmitting apparatus 31. It will be recalled that in the modification of FIG. 4, the conferencing switch was a normally open switch connected across the resistor 178. When switch 195 of the embodiment of FIG. 5 is open, the circuit through the receiving and transmitting apparatus is directly interrupted. In other words, the circuit is directly broken instead of interrupting the operation of the transistor 181 as is done in FIG. 4. The operation basically remains the same as in FIG. 4. The impedance is raised by reason of the circuit through the receiving and transmitting apparatus 31 being broken to permit another telephone to come on the line. At the same time, because of the circuits traced in connection with FIG. 4, the supervisory relay associated with the talking battery and the incoming lines remains energized.

The modification of FIG. 6 is similar to that of FIG. 4 except for the fact a resistor 196 is connected between the input terminal 70 and the rectifier bridge. This resistor is normally bypassed by a normally closed conferencing switch 198 so that under normal conditions, the resistor 196 plays no part. When, however, the conferencing switch 198 is open so as to place resistor 196 into the circuit, the impedance across the terminals 70 and 74 is again raised sufficiently to increase the voltage across these terminals and across the incoming lines sufficiently to permit another party to get on the line.

In the arrangement of FIG. 6, it is, of course, important to select the resistor 196 of a value sufficiently high to provide the desired increase in impedance but sufficiently low that the current flow through the transistors 176, 181 and 182 and the transmitting and receiving apparatus is still sufficiently high to maintain the associated supervisory relay energized. It will, of course, be understood that where the arrangement of FIG. 6 is used, the conferencing switch 189 shown in FIG. 4 is not employed.

MODIFICATION OF FIG. 7

In FIG. 7, I have shown a different type of privacy device which has been designated by the reference numeral 200. In this case, bidirectional electronic switches are again employed. In this case, the switches are bidirectional triodes 203 and 204 which are the type conventionally known as a Triac. Each of these switches has a gate electrode, the gate electrodes being designated by the reference numerals 205 and 206 respectively. The characteristic of such bidirectional switches is that they are normally nonconductive until a current flow takes place through the gate electrodes at which time they become bidirectionally conductive. Upon their becoming conductive, a circuit is established from the input terminal 70 through a resistor 208, Triac 203, the receiving and transmitting apparatus 31, Triac 204, and conductor 209 back to the other input terminal 74.

Connected between the gate electrodes 205 and 206 are two Zener diodes 210 and 211 which are connected back to back. It will be readily apparent that upon a sufficient voltage being applied between terminals 70 and 74, a current path exists between the input terminal 70, through the gate electrode 205 of Triac 203, Zener diode 210 in the forward conducting direction, Zener diode 211 in the reverse conducting direction, a resistor 214 and gate electrode 206 of Triac 204 and conductor 209 back to the other input terminal 204. In the circuit just traced, the circuit does not conduct until the voltage exceeds the reverse breakdown voltage of the Zener diode 211. At that time, a current will flow through the path just traced and will result in a current flow through the gate electrodes causing the Triacs 203 and 204 to become conductive. Thus the Zener diode 211 should be selected so that its reverse breakdown voltage will not be exceeded unless the voltage across the tip and ring conductors is equal to the normal voltage across these lines when none of the telephones connected thereto are in use.

As in the other modificatons, a conferencing switch 215 is provided. This is a normally closed switch shunting the resistor 208 so that resistor 208 is normally ineffective in the circuit. When, however, it is desired to connect another person to the same set of lines, the conferencing switch 215 is depressed to remove the short circuit around resistor 208 and place this in the circuit. Again, this will result in an increase in the impedance between terminals 70 and 74 and will cause the voltage across the incoming lines to which these terminals are connected to rise sufficiently to permit another telephone to be connected to the line through the action of its privacy device. Also, again, the current flow is sufficiently large to maintain the associated supervisory relay energized.

As in the other modifications, provision is made for automatically rendering the privacy device conductive when it is desired to use an intercommunication line. The means in this case involves an NPN transistor 216, the emitter and collector of which are connected across the Zener diode 211 so that when the transistor 216 becomes conductive, a conductive path is established around the Zener diode. Thus, it is unnecessary for the voltage to exceed the reverse breakdown voltage of Zener 211 for the Triacs 203 and 204 to be rendered conductive. The transistor 216 has a resistor 218 connected between the emitter and base so that the base is normally at the emitter potential. When, however, the key intercom switch is closed, a voltage is applied through conductor 77, terminal 78, and a resistor 219 to the base of transistor 216. As previously pointed out, this voltage is a positive voltage so that a transistor 216 is turned on to create a low voltage path around Zener diode 211. Thus, whenever the key switch for intercommunication is pushed, the Triacs are turned on even though the voltage between terminals 70 and 74 is below the normal voltage that exists before any telephones are in use.

SUMMARY

It will be seen from the above that I have provided a privacy device in which it is possible for the user of the telephone connected to the line to permit any other telephone to be connected to the same line. The means is not critical as to time so that if there is a delay in the answering of the telephone by the second party, the conferencing means is still effective. Furthermore, it is possible to allow more than one other party to be connected to the line. In addition, I have provided the means whereby whenever the phone is being used for intercommunication purposes, it is possible for any other user of the telephone by pressing his intercom key switch to also get on the same set of lines. Thus, despite the presence of the privacy device, the telephones can be freely used for intercommunication purposes.

It will further be seen that I have accomplished this by providing an arrangement which can readily be applied to any existing telephone without appreciable modification thereof. Since the privacy device is connected between the key switch and the receiving and transmitting apparatus, it is necessary to use only one privacy device for each telephone, regardless of the number of incoming lines or intercommunication lines to which the telephone is adapted to be connected.

In the foregoing specification, where I have referred to "incoming lines," this term is to be construed as applying to any telephone lines, other than intercommunication lines, over which a conversation or other communication can be conveyed regardless of whether the conversation or other communication is being transmitted or received.

While I have shown the apparatus specifically in connection with a key telephone system since it is particularly adaptable to such a system, it is to be understood that the privacy device may be employed wherever two or more telephones are adapted to be connected to any set of telephone lines. In general, while I have shown certain specific embodiments of my invention, it is to be understood that this is for purposes of illustration only and that my invention is limited solely by the appended claims.

I claim as my invention:

1. In combination with a telephone system of the type wherein there are one or more pairs of input lines,
   a plurality of telephones adapted to be connected to one or more such pairs of input lines, each telephone having a main control switch and a receiver assembly including a receiver electrically in series with said main control switch, said main control switch being closed when it is desired to talk, and
   a privacy device connected in series with said main control switch between the receiver of each telephone and any pair of input lines connected thereto, said privacy device comprising:
   voltage responsive means including an electronic switch in series with said receiver and effective upon closure of the main control switch of the telephone to which said voltage responsive means is connected and upon the presence of a voltage of at least a predetermined value across a pair of input lines to establish a relatively low impedance connection of the receiver of said telephone to said pair of input lines through said electronic switch, said voltage responsive means being effective to prevent the connection of said receiver to said pair of input lines when the voltage across the pair of input lines is below said predetermined value so that upon said voltage drop being so reduced the privacy device of any other telephone is effective to prevent the receiver of said other telephone from being connected to said pair of input lines;
   manually operable means independent of said main control switch for increasing temporarily the impedance in series with said receiver so as to restore the voltage across said pair of input lines to at least said predetermined value to enable the privacy device of another of said telephones to connect the receiver of such other telephone to said pair of input lines; and
   means for maintaining a circuit between said pair of input lines while said manually operable means is operated so that the current flow between said input lines is always maintained above a predetermined minimum value.

2. The combination of claim 1 in which each receiver assembly of each telephone includes both a receiver and a transmitter and in which the privacy device is connected between both the receiver and transmitter of each telephone and any pair of input lines connected thereto so that when said receiver is connected by said voltage responsive means to said pair of input lines, said transmitter is also so connected.

3. The combination of claim 1 in which the manually operable means comprises a manually operated electrical switch and an impedance connected to said voltage responsive means between the terminals of said switch so that when said switch is closed said impedance is effectively short circuited to alter the effect of said impedance upon the impedance in series with said receiver.

4. The combination of claim 3 in which said manually operated switch is normally closed and in which said impedance is connected in series with said main control switch so that when said manually operated switch is opened said impedance is effectively connected in series with said receiver to restore the voltage across said pair of input lines to at least said predetermined value.

5. The combination of claim 1 in which there are a plurality of pairs of input lines, switching means associated with each telephone for connecting the receiver of that telephone to any one of said plurality of pairs of input lines, said privacy device being connected between each such switching means and the receiver of the telephone so that the privacy device is effective regardless of which of said pairs of input lines said receiver is connected to.

6. The combination of claim 1 in which the receiver of the telephone is in a hand set and in which said main control switch is a hook switch which is closed upon removal of the hand set from its normal non-talking position.

7. The combination of claim 1 in which there are a pair of lines to which each of said telephones is adapted to be connected for maintaining an intercommunication call, in which each telephone has intercommunication switching means for connecting said receiver to said pair of lines in series with said privacy device, and in which means controlled by said intercommunication switching means is effective upon actuation of said intercommunication switching means to cause the privacy device of that telephone to establish said low impedance connection to the receiver even though the voltage across said pair of lines is below said predetermined value.

8. The combination of claim 1 in which the voltage responsive means includes a bi-directional electronic switch having a control electrode, said switch being connected in series between one of said input lines and said receiver, and control means for applying to said control electrode a signal dependent upon the voltage across said pair of input lines to cause said bi-directional switch to become conductive when said voltage has at least said predetermined value, said bi-directional switch having a relatively low impedance when conductive.

9. The combination of claim 8 in which there is a separate one of said bi-directional electronic switches in series with each of said input lines and said receiver and in which said control means is effective to cause both of said switches to become conductive when the voltage across said lines has at least said predetermined value.

10. The combination of claim 1 in which the voltage responsive means includes a bi-directional electronic switch having a relatively low impedance when conductive, said bi-directional switch being in series with said receiver and effective to establish said low impedance connection to said receiver when the voltage applied thereacross is above a break down value as a result of the voltage across the pair of input lines having at least said predetermined value, said bi-directional electronic switch having a control electrode effective when a proper signal is applied thereto to cause said bi-directional switch to become conductive even though the voltage across said input lines is below said predetermined value, and means including a switch operable when closed to apply said proper signal to said control electrode.

11. The combination of claim 1 in which said manually operable means is normally closed switch in series with said receiver between said circuit maintaining means and said receiver so that the opening of said normally closed switch increases the impedance between said pair of input lines while not interrupting the connection therebetween.

12. The combination of claim 1 in which the voltage responsive means includes a pair of bi-directional electronic switches, each having a control electrode and each being connected in series with a different one of said input lines, and means responsive to the voltage across said pair of input lines to cause a current flow through the control electrodes of each of said bi-directional switches to cause said switches to become conductive when the voltage across said pair of input lines is above said predetermined value.

13. The combination of claim 12 in which the means for controlling the current through said control electrodes comprises a pair of diodes connected back to back between said control electrodes, one of said diodes being a Zener diode, so that when the voltage across the lines exceeds the reverse breakdown voltage of said Zener diode, current flows through said control electrodes.

14. The combination of claim 13 in which means is provided for substantially short circuiting the Zener diode when the telephone is to be used for intercommunication purposes.

15. The combination of claim 1 in which said voltage responsive means includes a constant current, high impedance device connected in a circuit substantially in parallel with said receiver to minimize the effect of such voltage responsive means upon normal modulation of the current flowing through said receiver.

16. In combination with a telephone system of the type wherein there is one pair of input lines and another pair of lines used for intercommunication purposes,
 a plurality of telephones adapted to be connected to one or the other of such pairs of lines, each telephone having a main control switch, a first selector switch for connecting said telephone to said pair of input lines, an intercommunication switch for connecting said telephone to said pair of intercommunication lines, and a receiver assembly including a receiver electrically in series with said main control switch, said main control switch being closed when it is desired to talk, and
 a privacy device connected in series with said main control switch between the receiver of each telephone and any pair of lines connected thereto, said privacy device comprising:
 voltage responsive means including an electronic switch in series with said receiver and effective upon closure of the main control switch of the telephone to which said voltage responsive means is connected and upon the presence of a voltage of at least a predetermined value across the selected pair of lines to establish a relatively low impedance connection of the receiver of said telephone to said pair of lines through said electronic switch, said voltage responsive means being effective to prevent the connection of said receiver to said pair of lines when the voltage across the pair of lines is below said predetermined value so that upon said voltage drop being so reduced the privacy device of any other telephone is effective to prevent the receiver of said other telephone from being connected to said pair of lines;
 means independent of said main control switch for causing said electronic switch to become conductive to connect said receiver to the selected pair of lines even though the voltage across said pair of lines is below said predetermined value; and
 means controlled by said intercommunication switch for causing said last named means to be effective so that upon the user of any telephone actuating the intercommunication switch of that telephone and the main control switch thereof, the receiver of said phone is connected to said pair of intercommunication lines even though the voltage across said pair of lines is below said predetermined value.

* * * * *